United States Patent Office 3,029,221
Patented Apr. 10, 1962

3,029,221
PROCESS FOR THE PRODUCTION OF GRAFT COPOLYMERS COMPRISING REACTING (POLYSTYRYL)ALKALI METAL COMPOUNDS WITH RESINS CONTAINING CERTAIN REACTIVE PENDANT GROUPS
Frank J. Welch, South Charleston, W. Va., assignor to Union Carbide Corporation, a corporation of New York
No Drawing. Filed July 17, 1958, Ser. No. 749,054
3 Claims. (Cl. 260—45.5)

This invention relates to novel processes for polymerizing alpha-beta unsaturated monomers. More particularly it is concerned with a process for the production of (polystyryl)alkali metal compounds, the compounds themselves, and to the uses of said compounds.

Alpha-beta unsaturated monomers such as styrene have been polymerized to high molecular weight polymeric materials by many methods, among which there may be mentioned bulk and solution polymerizations in which the catalyst used is generally an organic peroxide; emulsion polymerizations in which persulfates are ordinarily employed; and suspension or granular polymerizations which also prefer peroxide type catalysts. In addition to these free radical type catalysts many ionic type catalysts have also been used, for example, stannic chloride or potassium amide in liquid ammonia. In all such cases, however, the mechanisms of the polymerization involve chain termination or chain transfer reactions which prevent addition of additional monomer units and halt the polymerization.

It has now been found that alkali metal hydrocarbons will polymerize alpha-beta unsaturated monomers represented by the formula:

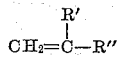

wherein R' represents a hydrogen atom or a methyl radical; and R" represents a phenyl radical, a chlorine atom, a cyano radical, a —CONH$_2$ radical or a —COOR''' radical wherein R''' represents a lower alkyl radical containing from 1 to about 8 carbon atoms. In particular it has been found that these alkali metal hydrocarbons will polymerize styrene to produce (polystyryl)alkali metal compounds which can be used to produce solid, high molecular weight polystyrene, polystyrene graft copolymers or polystyrene block copolymers. In this discussion styrene will be the monomer employed for the purposes of fully describing this invention. However, the acrylic and methacrylic esters, amides and nitriles, vinyl chloride and alpha-methylstyrene can also be polymerized. In addition, the copolymers of styrene and acrylonitrile can also be produced.

Illustrative monomers are methyl methacrylate, ethyl acrylate, 2-ethylhexyl acrylate, vinyl chloride, acrylonitrile, alpha-methylstyrene, and the like.

The (polystyryl)alkali metal compounds of this invention can be produced by contacting styrene with an alkali metal hydrocarbon in the presence of an inert organic diluent which does not participate in or interfere with the polymerization reaction. The (polystyryl)alkali metal compound is then treated with a compound containing an active hydrogen atom, or it can be further reacted with polymers or copolymers containing functional groups to produce graft copolymers, or a second polymerizable monomer can be reacted with the (polystyryl)alkali metal compound to produce a block copolymer. Where the monomer being polymerized contains a functional group, such as an ester group as found in the acrylates, the catalyst is added slowly to the monomer because of the reactivity of the alkali metal hydrocarbons with the functional group. In such instances the polymeric product produced cannot be used to produce graft or block copolymers.

The alkali metal hydrocarbons suitable as catalysts in this invention are the hydrocarbons of lithium, sodium or potassium as represented by the general formula RMe; wherein R represents a hydrocarbon radical, for example, an alkyl radical containing up to about 20 carbon atoms or more, and preferably up to about 10 carbon atoms, an aryl radical, an alkaryl radical or an aralkyl radical. Illustrative alkali metal hydrocarbons are ethyllithium, isobutyllithium, 2-ethylhexyllithium, phenyllithium, naphthyllithium, tolyllithium, xylyllithium, benzyllithium, alpha-methyl-benzyllithium, propylsodium, phenylsodium, tolylsodium, benzylsodium, butylpotassium, phenylpotassium, xylylpotassium, benzylpotassium, and the like.

The preferred inert organic diluents are those which are solvents for both the starting reactants and the polymer produced. Among these there may be mentioned the aromatic hydrocarbons, for example, benzene, toluene, xylene, ethylbenzene, t-butylbenzene, and the like. Also suitable are the saturated aliphatic and cycloaliphatic hydrocarbons, for example, n-hexane, octane, cyclohexane and the like. In addition, aliphatic and cyclic ether solvents can also be used, for example, tetrahydrofuran, diethylether, dioxane dibutyl ether, anisole, tetrahydropyran, and the like. It has been found that the rates of polymerization are faster in the ether solvents than in the hydrocarbon solvents, and that small amounts of ether in the hydrocarbon solvent increase the rates of polymerization.

The concentration of catalyst is not critical, and can be varied over a range of from about 0.001 percent to about 10 percent by weight, based on the weight of styrene, or higher; any catalytic amount can be employed. Preferably, however, a catalyst concentraion of from about 0.2 percent to about 5 percent by weight, based on the weight of styrene, is employed.

The molecular weight of the polystyrene produced is a function of the mole ratio of styrene to catalyst. High concentrations of catalyst leads to formation of low molecular weight polymer, while low concentration of catalyst leads to production of high molecular weight polymer. The concentration of styrene charged to the reaction vessel can vary widely, and is limited by the ability of the reaction equipment to agitate the resulting viscous solutions of (polystyryl)alkali metal polymer. Concentrations of styrene as high as 50 percent by weight or higher based on the weight of the reaction mixture, can be used. However, the preferred styrene concentration is from about 5 percent to about 25 percent in order to achieve adequate stirring. The same concentrations are applicable with the other alpha-beta unsaturated monomers.

The reactants and solvents should be free of substances which destroy the catalytic effect of the catalyst, for example, such impurities as water, oxygen, carbon monoxide, alcohols, and the like, and it is preferred to keep the total concentration of such impurities as low as possible, preferably below about 10 parts per million. Thus, the polymerizations are generally carried out in dry equipment, using anhydrous reactants, and under an inert gas atmosphere, such as nitrogen, helium, argon, methane, and the like.

The monovalent (polystyryl)alkali metal polymers produced can be represented by the general formula:

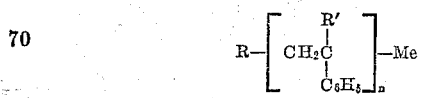

wherein R, R' and Me have the same meanings as hereinbefore indicated and $n$ is an integer such that the molecular weight of the polymer can be from about 1000 or less to greater than 100,000. By the term monovalent (polystyryl)alkali metal polymer is meant a polymer having but one alkali metal atom attached to the molecule; the term includes polymers of styrene and substituted styrene derivatives such as alpha-methylstyrene.

The polymerization reaction can be carried out at temperatures ranging from about $-100°$ C. up to about $100°$ C. With aliphatic and hydrocarbon diluents the preferred temperature range is from about $-10°$ C. to about $100°$ C. As previously stated, the rates of polymerization are markedly increased by the addition of small catalytic amounts, from about 0.01 percent to about 10 percent by weight of the hydrocarbon solvent, of ethers such as tetrahydrofuran; also, tertiary amines, such as triethylamine or tributylamine, serve to increase the rate of polymerization. With ethers as the inert organic solvent, the preferred temperature range is from about $-100°$ C. to about $100°$ C.

The production of the (polystyryl)alkali metal polymers can be carried out by adding a solution of the alkali metal hydrocarbon catalyst in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to polymer as long as the system remains free of impurities which inactivate the catalyst.

The (polystyryl)alkali metal polymer produced under the conditions set forth above is readily reacted with compounds containing an active hydrogen atom, such as water, alcohols, amines, acids, hydroxides, and the like, to give polystyrene, as represented by the following equation:

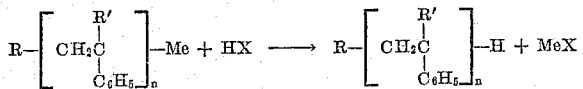

wherein X represents —OH, OR, —NH$_2$, —NHR, —NR$_2$, —OCR, and the like radicals.

The (polystyryl)alkali metal polymer can also be used to produce graft copolymers. These polystyrene graft copolymers are produced by reacting the (polystyryl)-alkali metal polymer with a polymer or copolymer which contains reactive pendant groups capable of reacting with the (polystyryl)alkali metal polymer. Examples of reactive pendant groups are ester groups, amido groups, cyano groups, keto groups, sulfonyl groups, epoxy groups, aldehydic groups, pyridyl groups, and the like. Such groups are to be found in the polymers and copolymers of poly(methyl methacrylate), polyacrylonitrile, poly(methyl vinyl sulfone), poly(vinyl chloride, poly(vinyl pyridine), and the like. The reaction in the production of graft copolymer, using poly(ethyl acrylate), for illustrative purposes, can be represented as follows:

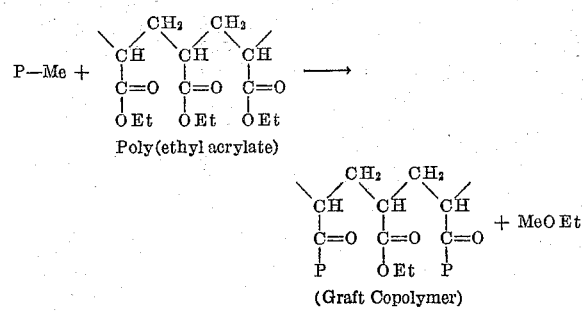

wherein P represents the

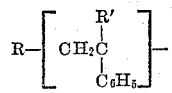

radical. However, it has been found that if the pendant functional group is attached to the polymer backbone by a carbon-oxygen or carbon-nitrogen bond, as is the case in poly(vinyl acetate) and poly(vinyl imides), respectively, rather than by carbon-carbon bonds, that grafting does not occur and a mixture of polystyrene and the other homopolymer is obtained instead, as follows:

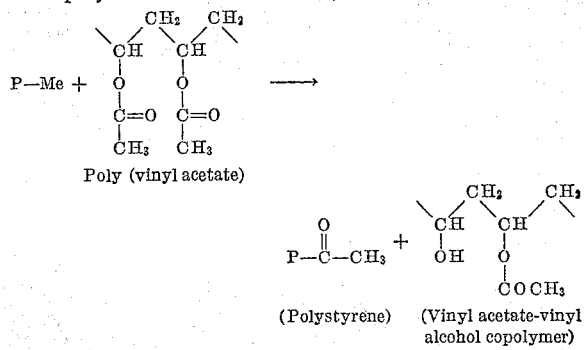

In addition, the polymer or copolymer to be grafted must not contain active hydrogen atoms, such as is present in carboxyl, alcohol or amino groups, for example, as found in poly(acrylic acid); though the sodium salts may probably be grafted.

In producing the polystyrene graft copolymers the (polystyryl)alkali metal polymer solution prepared as herein before indicated can be added as a solution or suspension in an inert organic diluent to an anhydrous solution of the polymer or copolymer to be grafted. The grafting reaction can be carried out at temperatures of from about $0°$ C. up to about the reflux temperature of the reaction mixture, and at subatmospheric, atmospheric, or superatmospheric pressure. The graft copolymer is then isolated by conventional procedures used for isolating polymers.

It has also been found that the (polystyryl)alkali metal polymers produced by this invention can be used to produce polystyrene block copolymers. These polystyrene block copolymers can be prepared by adding a second polymerizable monomer to the (polystyryl)alkali metal polymer solution produced as hereinbefore indicated; or by the addition of a polymer containing a functional group as part of the polymer chain.

Among the polymerizable monomers which can be used in producing these polystyrene block copolymers there may be mentioned methyl methacrylate, ethyl acrylate, 2-ethylhexyl methacrylate, cyclohexyl methacrylate, acrylonitrile, alpha-methylstyrene, vinyl chloride, butadiene, and the like, and lower olefin oxides such as ethylene oxide. When preparing the polystyrene block copolymers by this procedure, the second polymerizable monomer is added to the (polystyryl)alkali metal solution and the reaction is carried out at temperatures of from about $-100°$ C. to about $100°$ C., with the particular temperature employed being dependent on the reactivity of the second polymerizable monomer selected.

Among the polymers containing a functional group as part of the polymer chain which can be used in producing the polystyrene block copolymers there may be mentioned the polyesters, the polyamides, and the like. When the polystyrene block copolymers are produced by this procedure, there occurs a degradation of the polymer chain as indicated by the following equation, wherein a polymer is used for illustrative purposes:

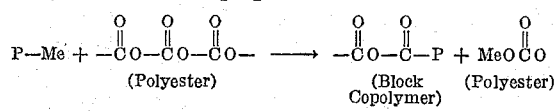

These polystyrene block copolymers can be produced by reacting dry organic solvent solutions of the (polystyryl)-alkali metal polymer and the second polymer at temperatures of from about 0° C. up to about the reflux temperature of the reaction mixture.

Thus this invention is concerned with the processes for producing (polystyryl)alkali metal polymers by the reaction of polystyrene in the present of an alkali metal hydrocarbon and an inert organic diluent. This (polystyryl)alkali metal polymer can then be converted to polystyrene or it can be used to produce graft copolymers or block copolymers as hereinbefore indicated.

The reduced viscosities of the polymers were determined at 30° C. in benzene at a concentration of 0.2 gram of polymer per 100 ml. of benzene unless otherwise indicated.

The following examples further serve to illustrate the invention:

Example 1

A clean, dry 12 ounce bottle was charged with a solution of 10 millimoles of butyllithium in 100 ml. of anhydrous toluene and 30 grams of styrene was then added at about 25° C. All operations were carried out under an anhydrous nitrogen atmosphere. The solution rapidly developed a brown color as an exothermic reaction took place raising the temperature to about 80° C. and a viscous solution of (polystyryl)lithium was produced.

The brown, viscous (polystyryl)lithium solution was added to about 500 ml. of methanol, whereupon the color disappeared and white polystyrene precipitated. The polystyrene was filtered at room temperature and dried in an oven at 60° C. Yield of polymer was 30 grams; it had a reduced viscosity in benzene at 30° C. of 0.09.

Example 2

A clean dry flask was charged with 400 ml. of anhydrous tetrahydrofuran and 91 g. of styrene under an anhydrous nitrogen atmosphere. The solution was cooled to −78° C. and with rapid stirring 4.0 millimoles of butyllithium was added as a one molar solution in benzene. The solution rapidly turned brown in color, and the temperature rose sharply to about 0° C. from the heat liberated by the polymerization even though the Dry Ice cooling bath still surrounded the flask. After the exothermic reaction subsided, the viscous solution was stirred for two hours at −78° C. The solution was warmed to room temperature, diluted with about 300 ml. of benzene, and poured into 2.5 liters of methanol. The white polystyrene precipitate was filtered and dried at 60° C. Yield of polystyrene was 91 grams; it had a reduced viscosity in benzene at 30° C. of 0.97.

Example 3

A clean, dry flask equipped with a stirrer and reflux condenser was charged with 30 grams of styrene and 300 ml. of anhydrous benzene. The solution was heated to 80° C. and 1 millimole of butyllithium was added. An anhydrous nitrogen atmosphere was maintained during the entire operation. As soon as the butyllithium was added, a brown color formed in the solution and gentle refluxing took place. After one hour the evolution of heat ceased indicating that the formation of (polystyryl)lithium was completed.

The brown colored (polystyryl)lithium solution was poured into one liter of methanol at 30° C. The white polystyrene precipitate was filtered and dried at 60° C. Yield of polystyrene was 30 grams; it had a reduced viscosity in benzene at 30° C. of 0.70.

Example 4

This example serves to illustrate that the molecular weight of the (polystyryl)alkali metal compound and of the polystyrene can be readily controlled by regulating the amount of styrene added to the reaction vessel, and that a true (polystyryl)alkali metal compound is formed having the alkali metal atom at the end of the molecule chain.

A solution of 10 millimoles of butyllithium in 300 ml. of anhydrous benzene was stirred at 80° C. in a clean, dry flask under an anhydrous nitrogen atmosphere. There was slowly added 20 ml. of styrene to this solution, and it stirred one hour at 80° C. and then a 50 ml. aliquot of the benzene solution of (polystyryl)lithium was removed. Another 10 ml. of styrene was slowly added to the reaction flask and after stirring for one hour a second 50 ml. aliquot was removed. This procedure was repeated until five aliquots had been obtained.

The aliquots were treated individually as follows:

The polystyryl)lithium solution was added to 200 ml. of methanol at 30° C. and the precipitated white polystyrene was recovered and dried. In all instances quantitative yields of polystyrene were obtained; and it will be observed that the reduced viscosity (in benzene at 30° C.) increased as the weight of polystyrene produced increased. This indicates that there is no chain transfer or termination step in the process, and that the molecular weight of the polystyrene increases as the amount of styrene added to the reaction is increased, thus making it a simple matter to control the molecular weight of the polystyrene, a problem which has heretofore plagued producers.

| Aliquot | Yield, g. | Reduced Viscosity |
| --- | --- | --- |
| 1 | 3 | 0.074 |
| 2 | 4 | 0.087 |
| 3 | 6 | 0.10 |
| 4 | 9 | 0.12 |
| 5 | 12 | 0.17 |

Example 5

A clean, dry flask equipped with a stirrer was charged with 30 grams of styrene and 300 ml. of hexane under an anhydrous nitrogen atmosphere. Then a solution of 5 millimoles of butyllithium in 5 ml. of anhydrous hexane was added. The temperature of the reaction mixture exothermically rose from 28° C. to 50° C., and the mixture was stirred without temperature control for six hours. A brown colored suspension of (polystyryl)lithium in the diluent was produced.

The (polystyryl)lithium suspension produced was treated with one liter of methanol at about 30° C. The precipitated white polystyrene was filtered and dried. Yield of polystyrene was 19 grams; it had a reduced viscosity in benzene at 30° C. of 0.18.

Example 6

A polystyrene-poly(methyl methacrylate) block copolymer was produced by the reaction of (polystyryl)lithium with methyl methacrylate.

A solution of (polystyryl)lithium was produced by a procedure similar to that described in Example 5 by reacting 30 grams of styrene in 300 ml. of anhydrous toluene using as catalyst a solution of 3 millimoles of butyllithium dissolved in 3 ml. of hexane. The maximum temperature achieved during the exothermic reaction was 42° C. After stirring for two hours, the amber solution of (polystyryl)lithium in toluene was cooled to −10° C. and 10 grams of methyl methacrylate was added. The reaction mixture was stirred for four hours at −15° C. and then treated with one liter of methanol. The white precipitate of polystyrene-poly(methyl methacrylate) block copolymer was filtered and dried. Yield was 40 grams, and the reduced viscosity of the block copolymer in benzene at 30° C. was 0.43.

Example 7

A polystyrene-poly(methyl methacrylate) graft copolymer was produced by the reaction of (polystyryl)lithium with poly(methyl methacrylate).

A solution of (polystyryl)lithium was produced by reacting 30 grams of styrene in 200 ml. of anhydrous benzene with butyllithium as catalyst. The benzene and 10 millimoles of butyllithium were placed in the flask and 30 grams of styrene was added at such a rate as to maintain a gentle reflux. The entire procedure was carried out under a dry nitrogen atmosphere. The mixture was stirred until the spontaneous refluxing of the solution ceased indicating completion of the reaction. The brown colored (polystyryl)lithium solution was then added to a solution of 10 grams of poly(methyl methacrylate) having a reduced viscosity of 0.37 (benzene at 30° C.) in 500 ml. of dry benzene at 80° C. The mixture was stirred for two hours, and the initial brown color slowly faded. The mixture was tested for completion of reaction by adding a small aliquot to twice its volume of ether. A milky suspension resulted, but no precipitate, indicating that the graft copolymerization was complete since unreacted poly(methyl methacrylate) is insoluble in ether and would have precipitated if ungrafted polymer was still present. The reaction mixture was then added to two liters of methanol at 30° C. and the resulting white precipitate was filtered and dried. The yield of crude polystyrene-poly(methyl methacrylate) graft copolymer was 36 grams; it had a reduced viscosity in benzene at 30° C. of 0.22. A six gram portion was extracted with boiling ether in a Soxhlet extractor. A total of 0.9 gram of homopolymeric polystyrene was recovered by this extraction, indicating that about 85% of the polymer formed in the reaction was the graft copolymer. The undissolved graft copolymer was highly swollen by the ether; after drying it had a reduced viscosity in benzene at 30° C. of 0.24.

Example 8

In a manner similar to that described in Example 7, (polystyryl)sodium was produced using 10 millimoles of butylsodium, instead of butyllithium, as catalyst. The (polystyryl)sodium solution was then added to poly(methyl methacrylate) having a reduced viscosity of 0.64 (benzene at 30° C.) as described in Example 7 to produce the polystyrene-poly(methyl methacrylate) graft copolymer. Yield was 38 grams, having a reduced viscosity in benzene at 30° C. of 0.54. Extraction of the graft copolymer crude with boiling ether indicated that 83% of the polymer produced was the graft copolymer, which had a reduced viscosity in benzene at 30° C. of 0.59; and that 17% was homopolymeric polystyrene, which is ether soluble.

Example 9

In a manner similar to that described in Example 7, (polystyryl)potassium was produced using 10 millimoles of butylpotassium, instead of butyllithium, as catalyst and a reaction temperature of 30° C. Ninety minutes was allowed for polymerization. The (polystyryl)potassium solution was then added to a solution of poly(methyl methacrylate) having a reduced viscosity of 1.28 (benzene at 30° C.) in 300 ml. of dry benzene at 30° C. The mixture was stirred for 1.3 hours at 30° C. to produce the polystyrene-poly(methyl methacrylate) graft copolymer. The yield was 40 g., having a reduced viscosity in benzene at 30° C. of 0.91. Extraction of the graft copolymer crude with boiling ether indicated that 81% of the polymer produced was the graft copolymer, which is insoluble in ether, and had a reduced viscosity in benzene at 30° C. of 1.15; and that 19% was homopolymeric polystyrene, which is soluble in ether.

Example 10

A Pyrex polymerization bottle was purged with nitrogen and charged with 200 ml. of hexane, 35 g. of vinyl chloride, and 35 ml. of a 0.86 M butyllithium solution in kerosene. The bottle was capped and rotated in a water bath at 40 to 65° C. for 12 hours. Poly(vinyl chloride), 1.0 g., was produced having a reduced viscosity of 0.19 at 30° C. in cyclohexanone solution.

Example 11

Thirty-five ml. of 0.86 M solution of butyllithium in kerosene was added dropwise over a period of one hour to a solution of 30 g. of acrylonitrile in 500 ml. of hexane at 0° C. All operations were carried out under a nitrogen atmosphere. After stirring an additional half hour at 0° C., the mixture was filtered and the solid polymer was dried. Twenty-eight grams of polyacrylonitrile were obtained having a reduced viscosity in dimethylformamide at 30° C. of 0.41.

Example 12

Using the procedure and conditions described in Example 11, 19 g. of poly(ethyl acrylate) was produced from 30 g. of ethyl acrylate. This polymer had a reduced viscosity of 0.15 in benzene at 30° C.

Example 13

Using the procedure and conditions described in Example 11, 24 g. of poly(methyl methacrylate) having a reduced viscosity of 0.15 was produced from 30 g. of monomer.

Example 14

To rapidly stirred mixture of 30 ml. of methyl methacrylate in 100 ml. heptane at −80° C. was added 10 millimoles of butyllithium. The mixture was stirred at −80° C. for six hours, whereupon 14 g. of poly(methyl methacrylate) was formed having a reduced viscosity of 0.29.

Example 15

To a solution of 50 ml. of alpha-methylstyrene in 200 ml. of hexane at −5° C. was added with rapid stirring 10 ml. of a 1.0 molar solution of butyllithium in benzene. Since no polymerization occurred in two hours, 10 ml. of tetrahydrofuran was added. The solution turned red immediately, and polymer precipitated. After stirring for three more hours, methanol was added and the mixture filtered. The polymer was washed with methanol and dried. It weighed 40 g. and had a reduced viscosity in benzene of 0.08 at 30° C.

What is claimed is:

1. A process for the production of polystyrene graft copolymers, which comprises reacting at from 0° C. up to the reflux temperature of the reaction mixture in an anhydrous, inert organic diluent, (polystyryl)alkali metal compounds represented by the general formula:

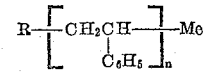

wherein R represents a monovalent hydrocarbon radical selected from the group consisting of alkyl radicals containing up to 10 carbon atoms, aryl radicals, alkaryl radicals and aralkyl radicals, Me represents an alkali metal atom, and $n$ is an integer such that the molecular weight of said (polystyryl)alkali metal compound is at least 1,000, with a resin containing reactive pendant groups, said reactive pendant groups selected from the group consisting of an ester radical, a cyano radical, a sulfonyl radical, and a chloro radical, and wherein said reactive pendant group is attached to the resin backbone via a carbon-carbon bond and is free of active hydrogen.

2. A process for the production of polystyrene-poly(methylmethacrylate) graft copolymers, which comprises reacting (polystyryl)lithium with poly(methyl methacrylate) in the presence of an anhydrous, inert hydrocarbon diluent at a temperature of from about 0° C. up to about the reflux temperature of the reaction.

3. A process for the production of polystyrene-polyacrylonitrile graft copolymers, which comprises reacting (polystyryl)lithium with polyacrylonitrile in the presence of an anhydrous, inert hydrocarbon diluent at a temperature of from about 0° C. to about 100° C.

(References on following page)

References Cited in the file of this patent

UNITED STATES PATENTS

| | | |
|---|---|---|
| 2,377,779 | Hanford et al. | June 5, 1945 |
| 2,608,555 | Bullitt | Aug. 26, 1952 |

FOREIGN PATENTS

| | | |
|---|---|---|
| 487,727 | Germany | Jan. 7, 1930 |

OTHER REFERENCES

Morton et al.: J. Am. Chem. Soc., volume 74, Nov. 5, 1952, page 5434.

Morton et al.: J. Am. Chem Soc., volume 74, Nov. 5, 1952, pages 5435 and 5436.

Smets et al.: J. of Polymer Science, volume 8, March 1952, pages 289 to 311.

UNITED STATES PATENT OFFICE
CERTIFICATION OF CORRECTION

April 10, 1962

Patent No. 3,029,221

Frank J. Welch

It is hereby certified that error appears in the above numbered patent requiring correction and that the said Letters Patent should read as corrected below.

Column 4, lines 72 to 75, the equation should appear as shown below instead of as in the patent:

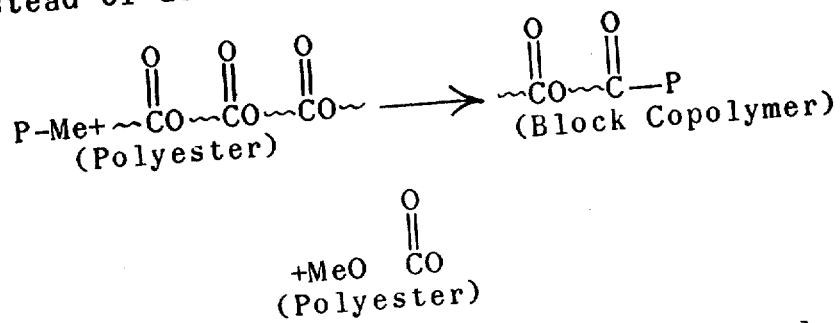

column 5, line 8, for "present" read -- presence --; column 6, line 14, for "polystyryl)" read -- (polystyryl) --; column 7, line 73, for "12" read -- 18 --.

Signed and sealed this 2nd day of October 1962.

(SEAL)
Attest:

ERNEST W. SWIDER

Attesting Officer

DAVID L. LADD

Commissioner of Patents